March 3, 1936. H. R. MOLES 2,032,711
CRASH PAD
Filed May 11, 1934
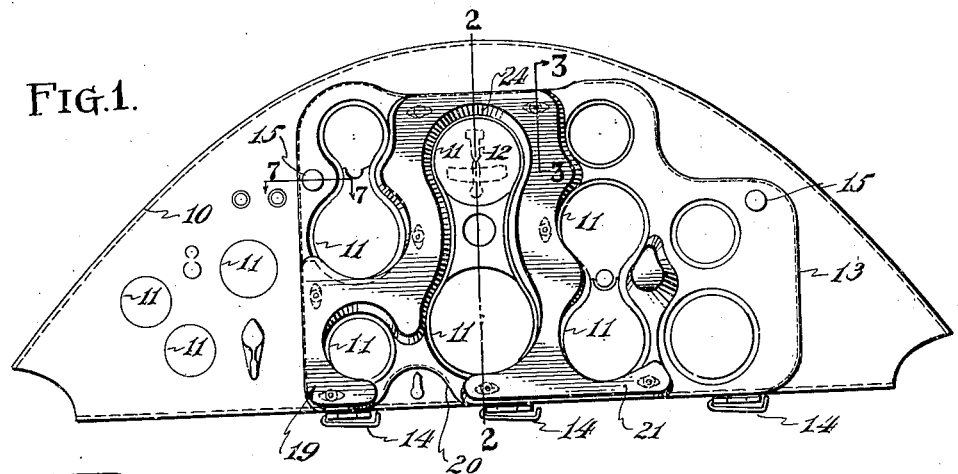
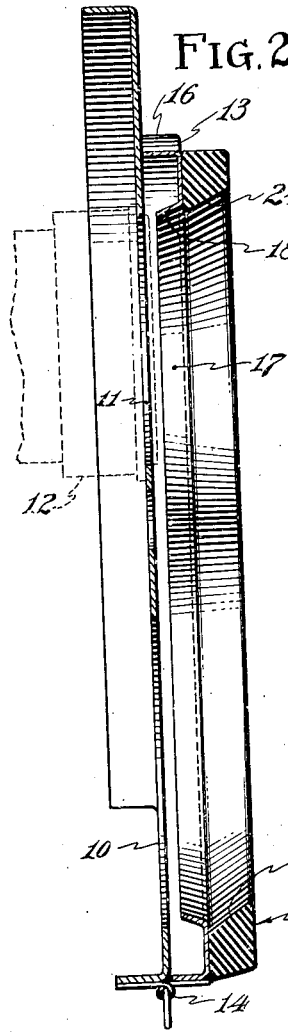
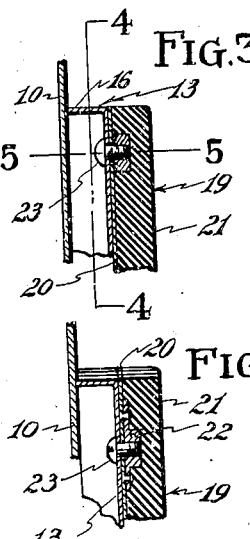
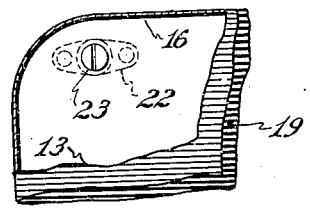
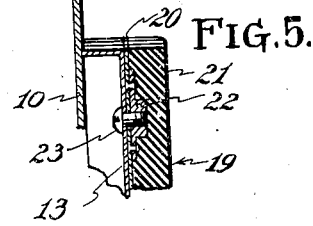
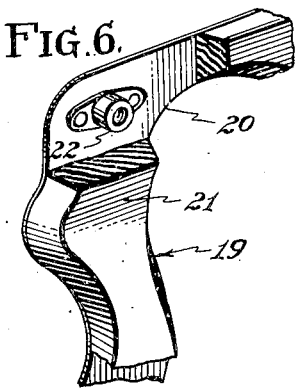
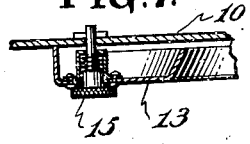
INVENTOR.
HOWARD R. MOLES.
BY
ATTORNEYS Patented Mar. 3, 1936

2,032,711

UNITED STATES PATENT OFFICE 2,032,711

CRASH PAD

Howard R. Moles, Kenmore, N. Y., assignor to Curtiss Aeroplane & Motor Company, Inc., a corporation of New York Application May 11, 1934, Serial No. 725,129

2 Claims. (Cl. 244—31)

This invention relates to accessory devices for aircraft, and is concerned particularly with an improved crash pad for use in conjunction with the instrument panels of aircraft.

In aircraft construction, an instrument panel is usually attached to the aircraft body just forward of the pilot, a plurality of instruments being attached to this panel. The instruments generally comprise three groups—flight instruments, navigational instruments, and engine instruments. As the flight instruments are the ones which are most frequently referred to, they are grouped in the center of the instrument panel or, in cases where the pilot sits to the side of the panel, are grouped directly in front of the pilot. The panel usually consists of a metallic plate having suitable openings therein for the accommodation of the instruments, which are mounted with their faces in flush relationship to said panel.

In the past, particularly in training aircraft, it has been usual to provide crash pads in front of a pilot or other member of the crew, so that, in case of a forced landing or a crackup, the shock of landing, which throws the pilot forward against the front part of the cockpit, will not result in serious injury to the pilot. Such crash pads, though effective, are somewhat unsightly, and their use in regular commercial or military craft is infrequent. Nevertheless, the possibility of bodily harm to the pilot still exists in case of a crash or forced landing.

It is an object of this invention to provide a crash pad adapted to be used in conjunction with the instrument panel of an aircraft.

It is a further object to provide a crash pad made from soft resilient material such as sponge rubber or the like, the pad being mounted over the faces of the instruments and being provided with openings through which the instruments may be viewed.

A further object is to provide a detachable crash pad organization comprising a backing plate to which soft cushion rubber is bonded, the unit being removably fixed to the instrument panel and being provided with openings through which the instruments may be viewed.

Still another object is to so form the resilient composition of a crash pad that a maximum amount of such composition may be utilized without interfering with proper viewing of the instruments.

For further objects, reference may be made to the specification and drawing, in which:

Fig. 1 is a view of an aircraft instrument panel to which the crash pad of this invention is attached;

Fig. 2 is an enlarged section on the line 2—2 of Fig. 1;

Fig. 3 is a section on the line 3—3 of Fig. 1;
Fig. 4 is a section on the line 4—4 of Fig. 3;
Fig. 5 is a section on the line 5—5 of Fig. 3;
Fig. 6 is a perspective view of a portion of the crash pad; and
Fig. 7 is a section on the line 7—7 of Fig. 1.

The instrument panel 10 is provided with a plurality of openings 11 within which instruments such as 12 are mounted. To the central part of the panel 10, or to that portion thereof which lies directly ahead of the pilot of the aircraft, a mounting plate 13 is attached, the attachment comprising a plurality of hinges 14 at the bottom of the plate and panel, and two or more releasable catches 15 toward the upper portions thereof. A detail of one of the catches 15 is shown in Fig. 7. The mounting plate 13 is provided with flanges 16 around the rim thereof, and each opening 17 which overlies each one of the panel openings 11 is provided with a slanted flange portion 18 around its edge to reinforce the mounting plate 13. A crash pad assembly 19 comprises a backing plate 20 to which is bonded a soft rubber pad or sheet of considerable thickness. The crash pad 19 is provided with openings matching with the openings 17 and 11, previously described, whereby the instruments mounted on the panel 10 may plainly be seen. Prior to bonding the sheet 21 to the backing plate 20, said backing plate is provided with a plurality of threaded bushings 22, whereby the pad assembly 19 may be attached to the mounting plate 13 by means of screws 23 passing through suitable openings in the mounting plate and threaded into the bushings 22. The attachment construction outlined avoids any metallic projections on the face of the crash pad. Attachment of the crash pad assembly to the instrument panel is effected by swinging the mounting plate 13 forwardly on its hinges, inserting the screws 23 through the mounting plate openings, placing the crash pad assembly 19 over the mounting plate and screwing the screws 23 into the bushing. Thereafter, the mounting plate with the crash pad assembly thereon may be folded up against the instrument panel and fastened thereto by the catches 15.

Ordinarily, the instrument panel is located below the eye level of the pilot. The cushioning element 21, then, is formed with the edges 24 of the instrument openings on a slant which is substantially parallel to the line of sight from the pilot's eye to the several instruments. Thus, toward the bottom of the sheet 21, the edges 24 will slant upwardly and slightly overlie the instrument openings, whereas the upper edges 24 will sweep away from the openings. Thus, a maximum amount of resilient material may be provided around each instrument, so that in case of crash, a maximum degree of protection is afforded to the pilot should his face or body impinge against the panel. It will be seen that there is a substantial distance from the face of the sheet 21 to the face of the instrument panel, so that, should the nose of the pilot or some other protuberant feature be thrown toward one of the instrument openings, such feature will not impinge upon the hard face of the panel until the rest of his face has contacted the face of the sheet. The resilient mass of the sheet 21 will tend, then, to protect the face or body of the pilot in case of crash.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In combination with an aircraft instrument panel adapted to be normally viewed from a point opposite and above the face thereof, a relatively thick, soft, resilient pad attached to said panel, said pad having openings corresponding to the panel instruments, and the edges of the pad openings being slanted throughout in a line substantially parallel to the line of sight when viewing said instruments, whereby the edges of said pad adjacent the upper portions of said instruments slant away from a normal to the panel, and the pad edges adjacent the lower portions of said instruments overlap normals to the panel.

2. A relatively thick resilient crash pad for use with an instrument panel having a plurality of instruments mounted substantially flush thereon, said pad having openings complementary to the instruments through which said instruments may be viewed, the edges of said pad all being so formed that a line intersecting said panel, and having a substantially constant acutely angled relation thereto, when traversed around said openings, lies on the surface of said pad edges, said line being traversed at all times in a substantially parallel path.

HOWARD R. MOLES.